United States Patent
Nishi

(10) Patent No.: US 10,293,499 B2
(45) Date of Patent: May 21, 2019

(54) MOVABLE ROBOT

(71) Applicant: FANUC CORPORATION, Yamanashi (JP)

(72) Inventor: Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/866,981

(22) Filed: Jan. 10, 2018

(65) Prior Publication Data

US 2018/0222064 A1 Aug. 9, 2018

(30) Foreign Application Priority Data

Feb. 6, 2017 (JP) ................................ 2017-019374

(51) Int. Cl.
*B25J 19/02* (2006.01)
*G05B 19/418* (2006.01)
(Continued)

(52) U.S. Cl.
CPC ............ *B25J 19/023* (2013.01); *B25J 5/007* (2013.01); *B25J 9/1669* (2013.01); *B25J 9/1692* (2013.01);
(Continued)

(58) Field of Classification Search
CPC ........ B25J 5/007; B25J 9/1697; B25J 13/088; B25J 19/021; G05D 1/0246;
(Continued)

(56) References Cited

U.S. PATENT DOCUMENTS 6,463,360 B1   10/2002 Terada et al.
9,074,381 B1*   7/2015 Drew .................. E04F 21/1872
(Continued)

FOREIGN PATENT DOCUMENTS

CN        104875177 A      9/2015
DE   10 2007 048 684 B4   9/2010
(Continued)

OTHER PUBLICATIONS

Japanese Decision to Grant a Patent dated Oct. 16, 2018, in connection with corresponding JP Application No. 2017-019374 (6 pgs., including machine-generated English translation).
(Continued)

*Primary Examiner* — Dale Moyer
(74) *Attorney, Agent, or Firm* — Maier & Maier, PLLC

(57) ABSTRACT

This movable robot includes a robot arm which performs an operation for a machine tool, a carriage for moving the robot arm to a predetermined installation position, a vision sensor which is supported by the carriage together with the robot arm and which captures an image of recognition information provided on the machine tool when the robot arm is placed at the predetermined installation position, a partner information receiving section for receiving a partner information regarding the machine tool for which the robot performs the operation, and a controller which determines whether the information obtained from the vision sensor corresponds with the partner information when the robot arm is placed at the predetermined installation position by the carriage, and when it corresponds, the robot arm is set to be a state in which the robot arm can perform the operation.

3 Claims, 4 Drawing Sheets

(51) Int. Cl.
*B25J 13/00* (2006.01)
*B25J 13/08* (2006.01)
*B25J 9/16* (2006.01)
*B25J 5/00* (2006.01)

(52) U.S. Cl.
CPC .............. *B25J 13/006* (2013.01); *B25J 13/08* (2013.01); *B25J 13/085* (2013.01); *G05B 19/41825* (2013.01); *G05B 2219/39045* (2013.01); *Y02P 90/087* (2015.11)

(58) Field of Classification Search
CPC ............ G05D 1/0234; G05B 19/41825; G05B 2219/31312; G05B 2219/39045; G05B 2219/40543; G05B 2219/40564; Y10S 901/01; Y02P 90/087
See application file for complete search history.

(56) References Cited

U.S. PATENT DOCUMENTS

| | | |
|---|---|---|
| 2008/0004750 A1 | 1/2008 | Ban et al. |
| 2010/0211220 A1 | 8/2010 | Nishi et al. |
| 2010/0219968 A1 | 9/2010 | Teutenberg |
| 2015/0032252 A1 | 1/2015 | Galluzzo et al. |
| 2015/0332213 A1 | 11/2015 | Galluzzo et al. |
| 2016/0313740 A1 | 10/2016 | Maschinenbau |
| 2016/0349741 A1 | 12/2016 | Takahashi et al. |
| 2017/0341221 A1* | 11/2017 | Hashimoto ................ B25J 5/00 |
| 2017/0361461 A1* | 12/2017 | Tan ............................ B25J 5/00 |
| 2017/0371342 A1* | 12/2017 | Hashimoto ............. B25J 5/007 |
| 2018/0093380 A1* | 4/2018 | Yoshida ................ B25J 19/023 |

FOREIGN PATENT DOCUMENTS

| | | |
|---|---|---|
| DE | 10 2011 050 357 A1 | 2/2012 |
| DE | 10 2012 022 640 A1 | 5/2014 |
| DE | 10 2014 000 375 A1 | 7/2015 |
| EP | 1 875 991 A2 | 1/2008 |
| JP | S62-166952 A | 7/1987 |
| JP | S62-191904 A | 8/1987 |
| JP | H05-055346 A | 3/1993 |
| JP | 2001-121461 A | 5/2001 |
| JP | 2002-304208 A | 10/2002 |
| JP | 2003-195919 A | 7/2003 |
| JP | 2005-334998 A | 12/2005 |
| JP | 2006-341957 A | 12/2006 |
| JP | 2008-012604 A | 1/2008 |
| JP | 2010-191602 A | 9/2010 |
| JP | 2010-247267 A | 11/2010 |
| JP | 2014-4755 A | 1/2014 |
| JP | 2016-60016 A | 4/2016 |
| JP | 2016-221622 A | 12/2016 |

OTHER PUBLICATIONS

Japanese Search Report dated Aug. 27, 2018, in connection with corresponding JP Application No. 2017-019374 (22 pgs., including machine-generated English translation).

Chinese Office Action dated Jan. 30, 2019, in connection with corresponding CN Application No. 201810101685.7 (13 pgs., including machine-generated English translation).

* cited by examiner

MOVABLE ROBOT

CROSS-REFERENCE TO RELATED APPLICATIONS

This application is based on and claims priority to Japanese Patent Application No. 2017-019374 filed on Feb. 6, 2017, the entire content of which is incorporated herein by reference.

TECHNICAL FIELD

The present invention relates to a movable robot which performs an operation for a machine tool.

BACKGROUND

Recently, in order to improve an operation efficiency, robots are installed in the vicinities of machine tools so as to make the robots perform a work supplying operation which is to supply works to the machine tool before processing, and a work pick-up operation which is to pick up the works after completion of the processing. (See Japanese Publication No. 2010-191602.)

SUMMARY

A movable robot according to an aspect of the present invention includes a robot arm which performs an operation for a machine tool; a carriage which supports the robot arm and which moves the robot arm to a predetermined installation position so that the robot arm can perform the operation; a vision sensor which is supported by the carriage together with the robot arm and which captures an image of recognition information provided on the machine tool when the robot arm is placed at the predetermined installation position; a partner information receiving section which receives a partner information regarding the machine tool for which the robot performs the operation; and a controller which determines whether the image captured by the vision sensor or information derived from the image corresponds with the partner information received by the partner information receiving section at the time of placing the robot arm at the predetermined installation position by the carriage and which sets the robot arm to be a state in which the robot arm can perform the operation.

DETAILED DESCRIPTION

A movable robot 1 and a production system using the same according to an embodiment of the present invention will be described below with reference to the accompanying drawings.

Figure 1:
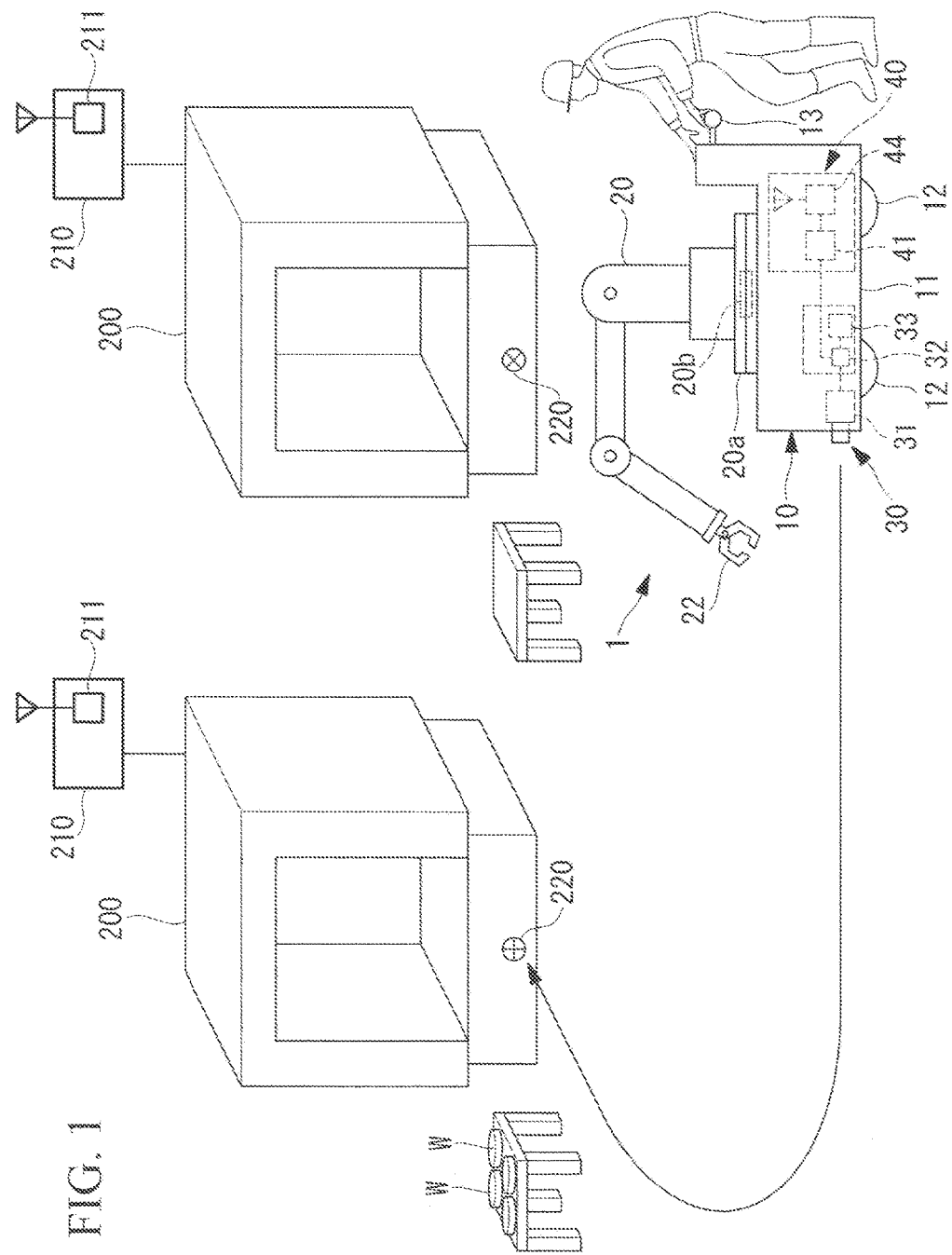
FIG. 1 is a schematic configuration view illustrating a movable robot and a production system using the same according to a first embodiment of the present invention.

As shown in FIG. 1, this production system has a plurality of machine tools 200 which conduct processing, assembling of works W, and the like, and more than one movable robot 1.

As shown in FIG. 1, the movable robot 1 includes a carriage 10, a robot arm 20 which is attached to the carriage 10 through a base 20a, a vision sensor 30 which is attached to the carriage 10, and a robot control unit 40 which is provided in the carriage 10.

The carriage 10 has a base frame 11, a plurality of wheels 12 which are rotatably attached to the base frame and which movably support the base frame 11, and a grip portion 13 which is provided in the base frame 11 and which is held by an operator when moving the carriage 10.

Figure 2:
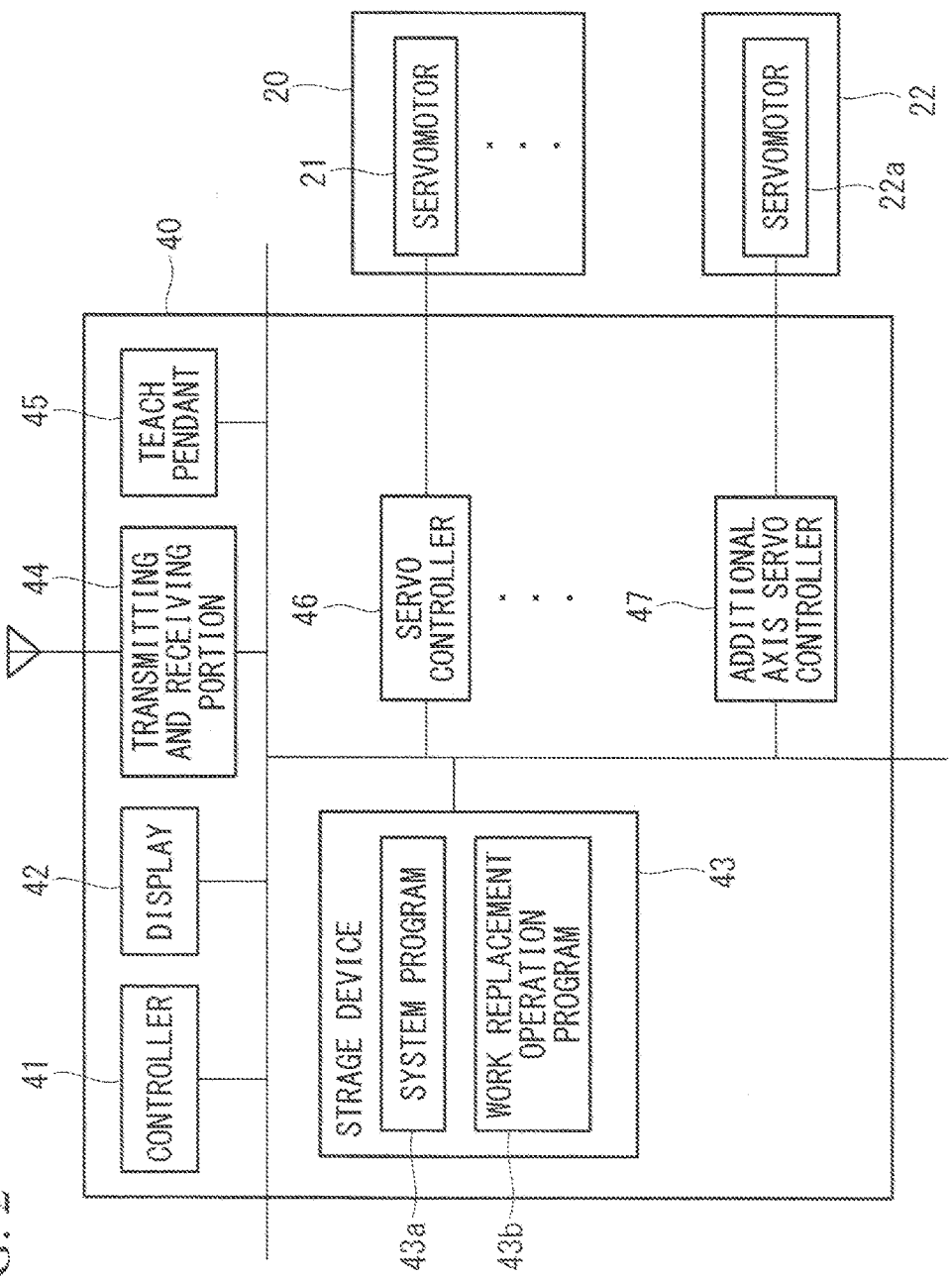
FIG. 2 is a block diagram of a robot control unit of the movable robot according to the embodiment.

The robot arm 20 has a plurality of movable portions and a plurality of servomotors 21 which drive the plurality of movable portions respectively (refer to FIG. 2). Various kinds of servomotors such as a rotary motor, a linear motor, and the like can be used as the servomotors.

A work tool 22 for conducting an operation such as replacement, inspection of the work W, and the like for the machine tool 200 is provided on a distal end of the robot arm 20, and the work tool 22 is driven by an additional axis servomotor 22a.

In this embodiment, the work tool 22 is a chuck which is used for gripping the work W so as to replace the work W, however, it is possible to use a work tool 22 depending on an operation to be performed.

Each of the servomotors 21, 22a has a built-in operation position detection device such as an encoder, and the like for detecting operation positions of the servomotors 21, 22a, detected values of the operation position detection devices are sent to the robot control unit 40, and such detected values are used to control the servomotors 21, 22a by the robot control unit 40.

The robot control unit 40 includes a controller 41 having, for example, CPU, RAM, and the like, a display 42, a storage device 43 having a non-volatile memory, ROM, and the like, a transmitting and receiving device 44 having an antenna, a teach pendant 45 being operated at the time of creating an operation program of the robot arm 20, and the like, a plurality of servo controllers 46 which are provided so as to respectively correspond with the servomotors 21 of the robot arm 20, and an additional axis servo controller 47 which is provided so as to correspond with the additional axis servomotor 22a (refer to FIG. 2).

A system program 43a is stored in the storage device 43, and the system program 43a provides a basic function of the robot control unit 40. Also, at least one work replacement operation program 43b which is created by using the teach pendant 45, for example, is stored in the storage device 43.

For example, the controller 41 is operated by the system program 43a, reads the work replacement operation program 43b which is stored in the storage device 43 so as to store it in RAM temporarily, and sends control signals to the servo controllers 46, 47 in accordance with the read work replacement operation program 43b, which controls servo amplifiers of the servomotors 21, 22a, and makes the robot arm 20 perform the work replacement operation.

Also, the base 20a of the robot arm 20 have a built-in force sensor 20b, and the force sensor 20b is configured so as to detect force applied to the robot arm 20, and to send the detected value to the robot control unit 40. The force sensor 20b performs detection as a six-axis sensor, for example. The controller 41 determines whether the force detected by the force sensor 20b is within a reference value of force generated by a weight of the robot arm 20 and the work W and by an operation of the robot arm 20. When such force exceeds the reference value, the controller 41 judges that the operator, a surrounding object, and the like touches the robot arm 20 unintentionally, the controller 41 stops the operation of the robot arm 20 or reduces operational speed of the robot arm 20 largely.

The reference value varies depending on whether the robot arm 20 has the work W or not, postures of the robot arm 20, operation condition of the robot arm 20, and the like. Since the operation is stopped or the operational speed is reduced when such unintentional contact occurs, and for that reason, a robot protecting the operator and the surrounding object may be called as a collaborative robot, a cooperative robot, and the like. Instead of the force sensor, a vision sensor for cooperative control can be used to observe the robot arm 20 and its surroundings so as to prevent the unintentional contact based on the detected result of the vision sensor and to stop the operation or to reduce the operational speed at the time of the unintentional contact.

On the other hand, each of the machine tools 200 includes a machine tool control unit 210, and the machine tool control unit 210 is configured to control drive units respectively driving a servomotor of a main shaft, a chuck, a brake, a tool drive device, a tool changer, and the like of the machine tool 200. In addition, the machine tool control unit 210 also includes a transmitting and receiving device 211 having an antenna for conducting wireless communication with the robot control unit 40 (refer to FIG. 1).

Figure 4:
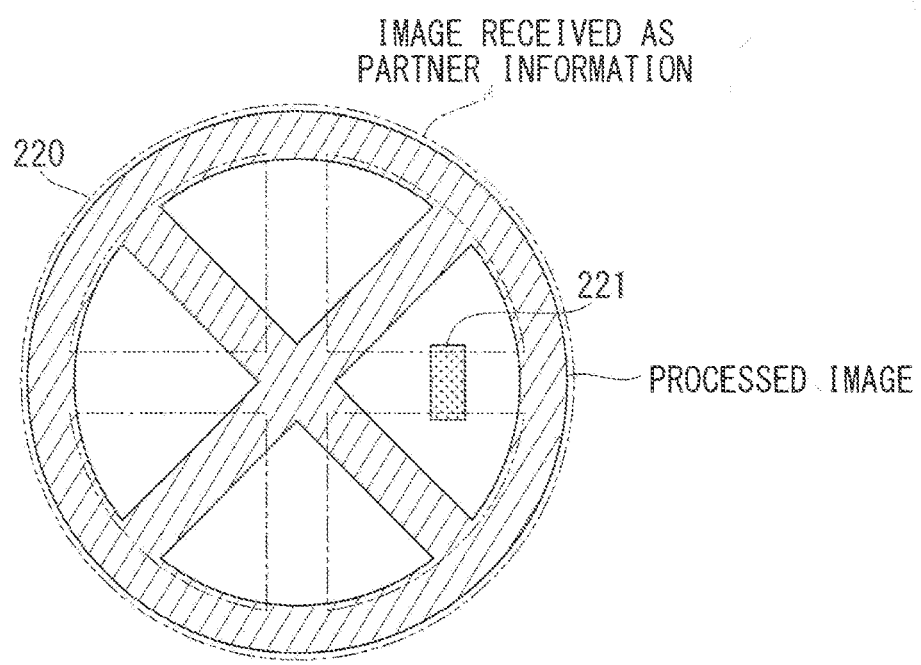
FIG. 4 is an example diagram illustrating a comparison state of a processed image and a partner information according to the present embodiment.
Figure 5:
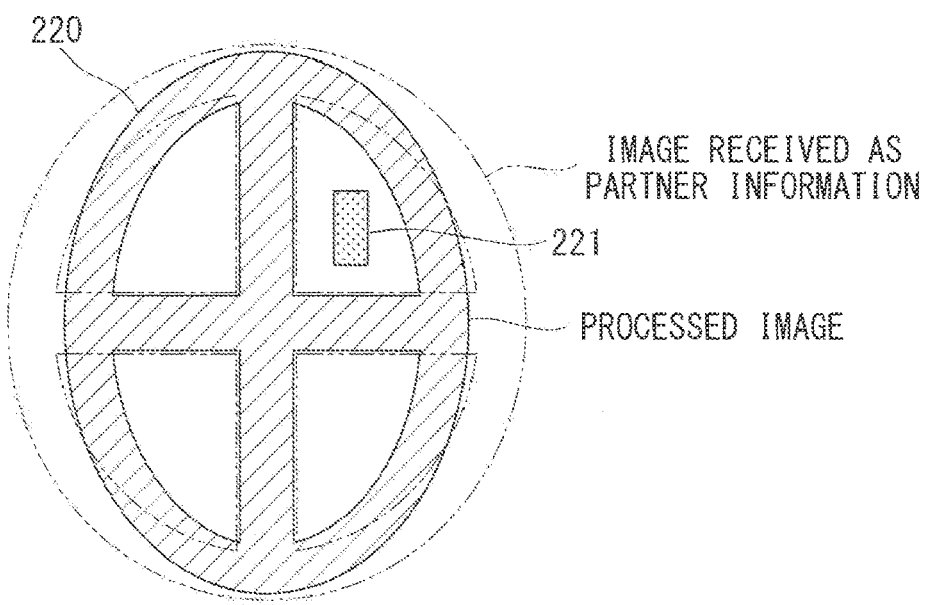
FIG. 5 is another example diagram illustrating a comparison state of a processed image and a partner information according to the present embodiment.

The front panel of the machine tool 200 has a mark 220 which is a unique recognition information, and the mark 220 has an ID information display 221 displaying ID information such as a one-dimensional barcode, a two-dimensional barcode, and the like at the inside thereof or in the vicinity thereof (refer to FIGS. 4, 5). Different ID information may be assigned for every machine tool 200, or the ID information may be assigned so as to correspond with the type of the machine tool 200.

The vision sensor 30 has an imaging device 31 such as a CCD camera and the like for capturing an image of the mark 220 and the ID information display 221, an image processor 32 for conducting predetermined image processing to the image captured by the imaging device 31 and sending the processed image to the robot control unit 40, and a storage device 33 (refer to FIG. 1).

The image processor 32 is configured using a computer having CPU, RAM, and the like, and performs known image processing such as static thresholding process, dynamic thresholding process, or the like on the captured image, and stores the processed image in the storage device 33, and sends the processed image as information obtained from the captured image to the robot control unit 40.

Also, the image processor 32 may send location information of feature points (for example, location data of individual points constituting the edge lines and the ridgelines of a cross line of the mark 220) of the mark 220 existing in the processed image as information obtained from the captured image, and may send information read from the ID information display 221 as information obtained from the image to the robot control unit 40. On the other hand, the image processor 32 may send the captured image itself to the robot control unit 40.

Figure 3:
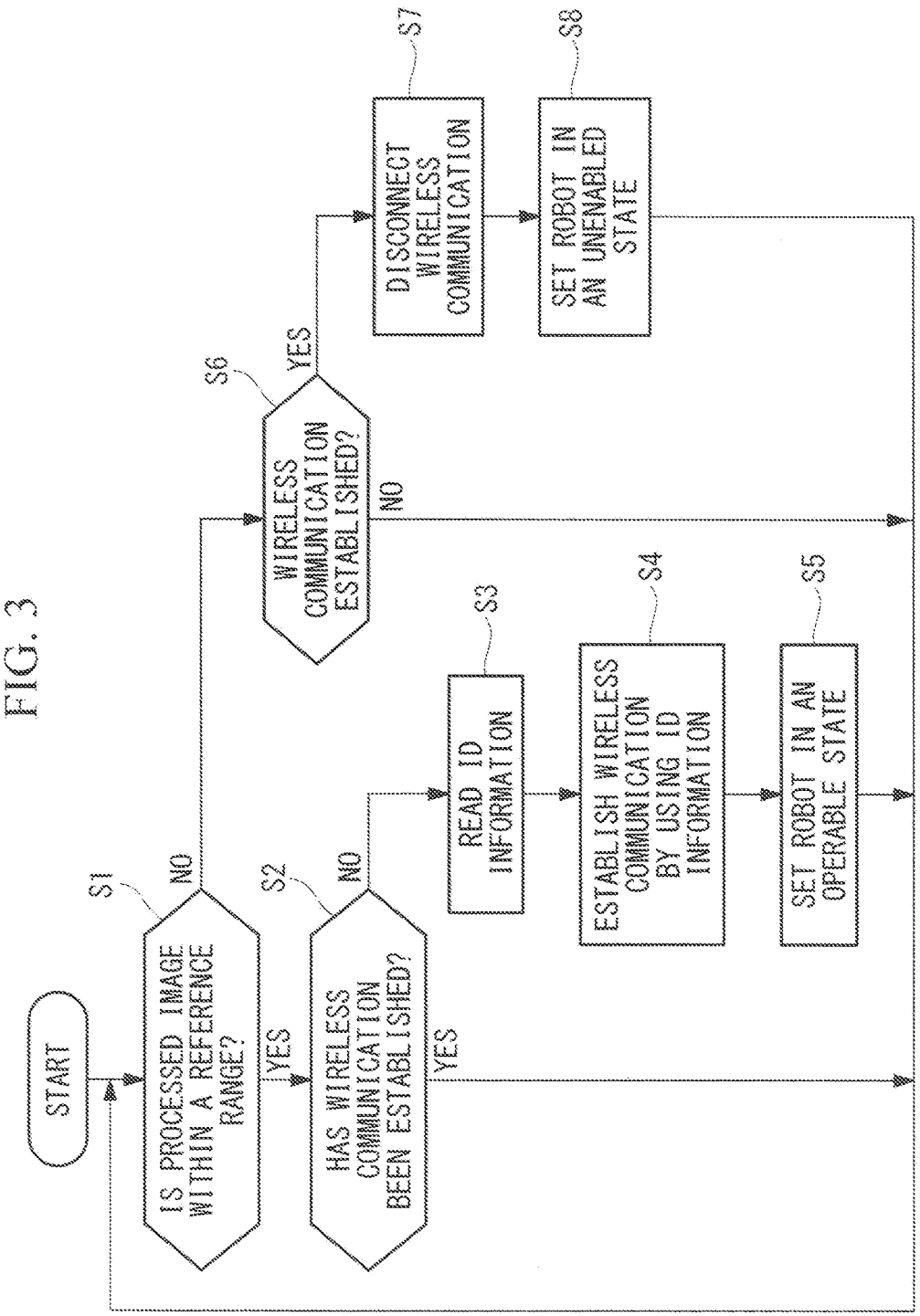
FIG. 3 is a flow chart illustrating an operation of a controller of the movable robot according to the embodiment.

An example of the operation of the controller 41 of the robot control unit 40 of the above-described movable robot 1 will be described below with reference to FIG. 3.

Firstly, before the operation, the controller 41 receives information (partner information) of the machine tool 200 for which the robot performs the operation from a production management system, which is not shown, through the transmitting and receiving device 44, and stores the partner information in the storage device 43. For example, the machine tool 200 for which the robot performs the operation next is the machine tool 200 located at the left side in FIG. 1, and the robot receives an image of the mark 220 which is provided on the front panel of the machine tool 200 as the partner information, and stores the image in the storage device 43. After the operator places the carriage 10 in front of the machine tool 200 to which the robot performs the operation, the carriage 10 is fixed at the position by means of brake, outrigger, wheel stopping device, or the like, which is not shown, provided in the carriage 10.

At this state, as shown in FIG. 1, when the operator moves the carriage 10 to the front of the left machine tool 200, the image of the mark 220 at the front surface of the machine tool 200 is captured by the imaging device 31 of the vision sensor 30, and the processed image is sent to the robot control unit 40, the controller 41 compares the processed image and the partner information stored in the storage device 43 so as to determine whether at least a shape and a size of the mark 220 of the processed image is within the reference value relative to the partner information, and preferably the storage device determines whether a position of the mark 220 in the processed image is within a reference value (step S1).

For example, when the operator moves the carriage 10 to the front of the right machine tool 200 shown in FIG. 1 by mistake, and when a shape of the processed image is different from the image (two-dot chain line) received as the partner information, as shown in FIG. 4 ("NO" in step S1), the process returns to the step S1 without establishing the wireless communication with the machine tool 200 (step S6). Since the step S6 is a step which determines whether the wireless communication has been established, and the wireless communication is not established in this case, the process returns to the step S1 without establishing the wireless communication.

In another configuration, when the operator moves the carriage 10 diagonally toward the left machine tool 200, and as shown in FIG. 5, when an aspect ratio of the processed image is not within a reference range when compared with an aspect ratio of the image (two-dot chain line) received as the partner information, or when a size of the processed image is not within the reference range when compared with a size of the image received as the partner information while the aspect ratio is within the reference range, the process returns to the step S1 without establishing the wireless communication with the machine tool 200 (step S6).

Moreover, at the time of comparing the image received as the partner information with the processed image, it is preferable to make a state where the two can be easily compared by conducting processing which matches the center portion of the mark 220 of the processed image with the center portion of the image received as the partner information, and the like.

When the processed image is determined to be within the reference range in step S1, since the wireless communication has not yet been established (step S2), the controller 41 reads the ID information from the ID information display 221 in the processed image (step S3).

Subsequently, the controller 41 sends a wireless communication request to the machine tool control unit 210 of the machine tool 200 by using the read ID information, and thereby establishes the wireless communication with the machine tool control unit 210 (step S4). Also, when a operation request is sent from the machine tool control unit 210 of the machine tool 200, the controller sets the robot arm 20 so that the robot arm 20 can perform the requested operation (robot operation enabled state), and the process returns to the step S1 (step S5).

In this state, when the carriage 10 does not move, the step S1 determines "YES", and the step S2 determines "YES", which keeps the robot in the robot operation enabled state.

Whereas, for example, when the operator moves the carriage 10 unintentionally and "NO" is determined in the step S1, since the wireless communication has been established, "YES" is determined in step S6, therefore, the controller 41 conducts a process to disconnect the wireless communication (step S7), and sets the robot arm 20 so that the robot arm 20 cannot be operated (robot operation unenabled state) (step S8).

For example, when the position of the robot arm 20 is shifted relative to the machine tool 200 after the robot arm 20 is placed in front of the intended machine tool 200, there is a problem that the operation by the robot arm 20 cannot be conducted accurately. Therefore, the aforementioned configuration that continuously monitors whether the robot arm 20 is placed at a predetermined installation position relative to the machine tool 200 is advantageous to guarantee the accurate work conducted by the robot arm 20.

As described above, according to this embodiment, the transmitting and receiving portion 44 which functions as a partner information receiving section receives the partner information, and the image of the mark 220 which is provided on the machine tool 200 is captured by the vision sensor 30 supported by the carriage 10, and when the captured image or the information obtained by the captured image corresponds with the partner information, the robot arm 20 will be set to be a state in which the robot arm 20 can perform the operation. Accordingly, unless the vision sensor 30 is placed within a physically predetermined range relative to the machine tool 200 of the operation target, the robot arm 20 is not set to be the state in which the robot arm 20 can perform the operation, which makes it possible to reliably place the robot arm 20 at the predetermined installation position relative to the machine tool 200 of the target operation.

Moreover, the controller 41 of the robot control unit 40 determines whether the mark 220 in the image captured by the vision sensor 30 is within the reference shape range and the reference size range, and when it is within the reference shape range and the reference size range, the robot arm 20 is set to be a state in which the robot arm 20 can perform the operation. Therefore, it is possible to guarantee that the robot arm 20 is positioned at the predetermined installation position relative to the machine tool 200 of the target operation more reliably.

Further, the vision sensor 30 captures the image of the mark 220 and the ID information display 221, and the robot control unit 40 establishes the wireless communication with the machine tool 200 by using the ID information obtained from the ID information display 221. Therefore, it is unnecessary for the operator to visually confirm the ID information of the machine tool 200 and input such information to the robot control unit 40, which is advantageous for preventing the robot control unit 40 from establishing the wireless communication with the machine tool control unit 210 of the unintended machine tool 200.

The aforementioned embodiment illustrates the mark 220 having the ID information display 221 inside thereof or in the vicinity thereof, however, it is also possible that the mark 220 itself displays the ID information like an one-dimensional barcode, two-dimensional barcode, or the like. In such a case, whether a size or a shape of the mark 220 corresponds with the partner information can be determined, and the robot arm 20 is set to be a state in which the robot arm 20 can perform the operation when the mark 220 corresponds with the partner information, and also the mark 220 is provided on the front panel of the machine tool 200 together with the ID information display 221.

Moreover, the work replacement operation program 43b may be sent to the robot control unit 40 from the machine tool control unit 210 after the wireless communication is established.

Further, it is possible to configure the system so that the image captured by the imaging device 31 of the vision sensor 30 is image-processed by the robot control unit 40.

Also, a hood for narrowing the field of view can be provided on the distal end of the imaging device 31 so as to limit the position of the carriage 10 relative to the machine tool 200 more strictly.

Further, the partner information may be location data of respective points configuring a mark which is the partner information, it may be configured that the partner information is input to an input device provided in the movable robot 1, and the robot control unit 40 receives such partner information.

Moreover, the imaging device may be provided on the robot arm 20 instead of the carriage 10. In a case where the position and the posture of the imaging device 31 are changed by the robot arm 20, amount of the change is obtained based on detected values of the operation position detection devices of the servomotors 21 of the robot arm 20, and whether the robot arm 20 is placed at an installation position thereof can be determined in consideration of the amount of the change.

The inventor has arrived at the following aspects of the present invention.

A movable robot according to an aspect of the present invention includes a robot arm which performs an operation for a machine tool; a carriage which supports the robot arm and which moves the robot arm to a predetermined installation position so that the robot arm can perform the operation; a vision sensor which is supported by the carriage together with the robot arm and which captures an image of recognition information provided on the machine tool when the robot arm is placed at the predetermined installation position; a partner information receiving section which receives a partner information regarding the machine tool for which the robot performs the operation; and a controller which determines whether the image captured by the vision sensor or information derived from the image corresponds with the partner information received by the partner information receiving section at the time of placing the robot arm at the predetermined installation position by the carriage and which sets the robot arm to be a state in which the robot arm can perform the operation.

In this aspect, the partner information receiving section receives the partner information, and an image of the recognition information which is provided on the machine tool is captured by the vision sensor which is supported by the carriage, and when the captured image or the information obtained from the image corresponds with the partner information, the robot arm is set to be the state in which the robot arm can perform the operation. As described above, the robot arm is not set to be the state where the robot arm can perform the operation unless the vision sensor is physically placed within a predetermined range relative to the operation target machine tool, which enables reliable disposition of the robot arm to the predetermined installation position relative to the operation target machine tool.

With the above aspect, it is preferable that the controller is configured to further determine whether the recognition information in the image captured by the vision sensor or the information derived from the image is within a reference shape range and a reference size range, and the controller is configured to set the robot arm to be the state in which the robot arm can perform the operation when the recognition information is within the reference shape range and the reference size range.

Therefore, it is possible to guarantee that the robot arm is placed at the predetermined installation position relative to the operation target machine tool more reliably.

With the above aspect, it is preferable that the vision sensor is configured to capture the image of the recognition information together with an image of an ID information display provided on the machine tool, and the controller is configured to establish wireless communication with the machine tool by using ID information obtained from the ID information display.

Thus, it is unnecessary that the operator confirm the ID information of the machine tool visually and input the information to the controller, which is advantageous for preventing the controller from establishing unintended wireless communication with the machine tool.

According to the aforementioned aspects, it is possible to reliably place a robot at a predetermined installation position for performing an operation to an operation target machine tool.

REFERENCE SIGNS LIST 1 movable robot
10 carriage
11 base frame
12 wheel
13 grip portion
20 robot arm
22 work tool
30 vision sensor
31 imaging device
32 image processing device
33 storage device
40 robot control unit
41 controller
44 transmitting and receiving portion
200 machine tool
210 machine tool control unit
211 transmitting and receiving portion
220 mark
221 ID information display
W work

The invention claimed is:

1. A movable robot comprising:
a robot arm which performs an operation for a machine tool;
a carriage which supports the robot arm and which moves the robot arm to a predetermined installation position so that the robot arm can perform the operation;
a vision sensor which is supported by the carriage together with the robot arm and which captures an image of recognition information provided on the machine tool when the robot arm is placed at the predetermined installation position;
a partner information receiving section which receives a partner information regarding the machine tool for which the robot performs the operation; and
a controller which determines whether the image captured by the vision sensor or information derived from the image corresponds with the partner information received by the partner information receiving section at the time the robot arm is placed at the predetermined installation position by the carriage and which sets the robot arm to be a state in which the robot arm can perform the operation.

2. The moveable robot according to claim 1, wherein the controller is configured to further determine whether the recognition information in the image captured by the vision sensor or the information derived from the image is within a reference shape range and a reference size range, and the controller is configured to set the robot arm to be the state in which the robot arm can perform the operation when the recognition information is within the reference shape range and the reference size range.

3. The moveable robot according to claim 1, wherein the vision sensor is configured to capture the image of the recognition information together with an image of an ID information display provided on the machine tool, and
the controller is configured to establish wireless communication with the machine tool by using ID information obtained from the ID information display.

* * * * *